Sept. 22, 1953     N. R. KRAUSE     2,652,679
WINDROW TURNING APPARATUS

Filed Feb. 26, 1948     3 Sheets-Sheet 1

INVENTOR.
Norman R. Krause
BY
Thiess, Olson & Mecklenburger
Att'ys

INVENTOR.
Norman R. Krause

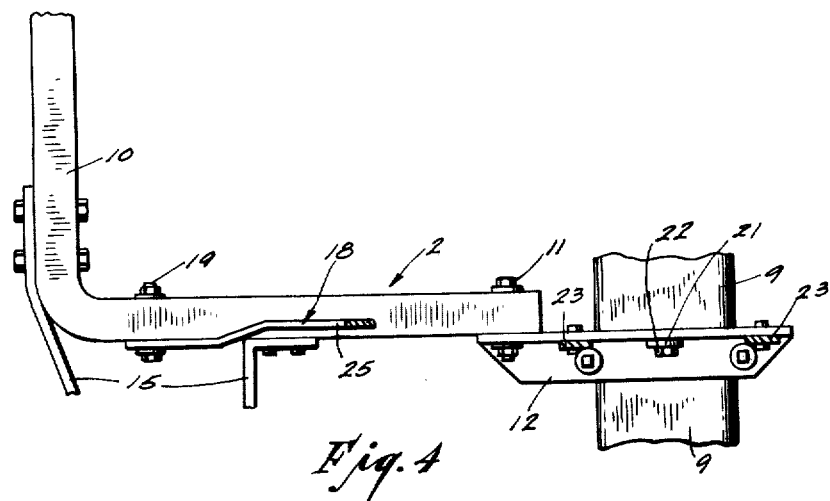
Fig. 4
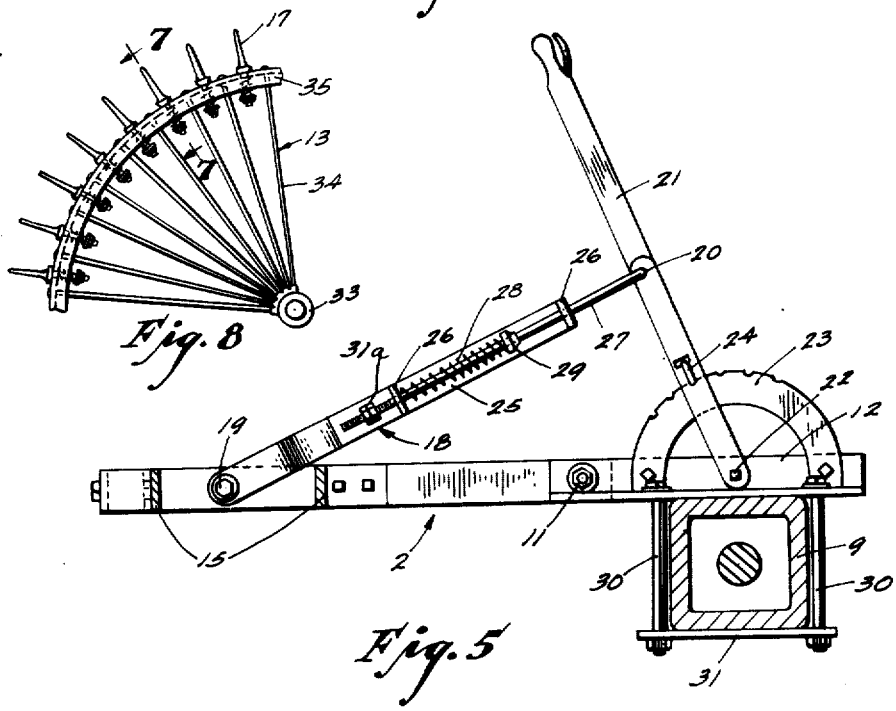
Fig. 8
Fig. 5
INVENTOR.
Norman R. Krause

Patented Sept. 22, 1953

2,652,679

UNITED STATES PATENT OFFICE 2,652,679

WINDROW TURNING APPARATUS

Norman R. Krause, Racine, Wis., assignor to J. I. Case Company, Racine, Wis., a corporation of Wisconsin Application February 26, 1948, Serial No. 11,085

14 Claims. (Cl. 56—372)

My invention relates to tractor-drawn windrow turning apparatus.

Grain, when it lays in the windrow, is often rained on, and so beaten down into the stubble. Rain, in some cases, might continue for a week or longer, and while sufficient dry weather might eventually dry out the windrow the harvest would be decidedly speeded up if the windrow were merely picked up and rolled over onto a drier stubble and the under side of the windrow thus exposed to the sunshine. In this manner it might be possible to continue combine operations within a few hours after such a windrow was rolled over, whereas, if it were left on the ground such a windrow might require three or four days of drying before being fit to combine.

One of the objects of my invention is to provide improved apparatus for speeding up the drying out of a windrow which has been rained on and thus battered down into the stubble.

A further object of my invention is to provide such apparatus which can be easily and quickly attached and detached with respect to a tractor.

A further object is to provide such an apparatus by means of which the agitation of the windrow is accomplished simply and effectively.

A further object of my invention is to provide a windrow turner which may be selectively secured to operate either on the right-hand or left-hand side of the tractor to take care of either right-hand or left-hand windrows.

A further object is to provide an improved windrow turner which will shift the windrow inwardly substantially behind a rear tractor wheel where it will not be run down by the tractor.

A further object is to provide a windrow turning wheel having spring-pressed turning fingers in which the spring means are located on the inside of the rim of the wheel out of the way of the material being turned so that they will not get tangled up with the material in the windrow.

A further object is to provide a windrow turning wheel in which the turning finger is so mounted as to enable the wheel to slew sidewise without causing the finger points to dig in and catch in the ground.

A further object is to provide a windrow turning wheel which is spring-positioned to enable the finger to be deflected to pass around a stone or clod and to avoid bouncing over an obstruction, thus resulting in a smooth operation of the wheel.

Further objects and advantages of the invention will be apparent from the description and claims.

In the drawings in which an embodiment of my invention is shown,

Fig. 4 is an enlarged detail plan view showing part of the rockable frame and axle housing;

Fig. 5 is a side elevational view showing the spring pressure adjusting mechanism;

Fig. 8 is a side elevational view showing part of the turning wheel, and

Figure 1:
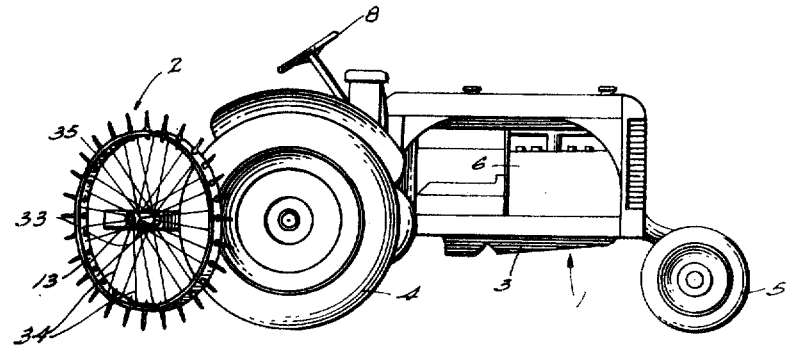
Figure 1 is a side elevational view showing a tractor and windrow turner drawn thereby.
Figure 2:
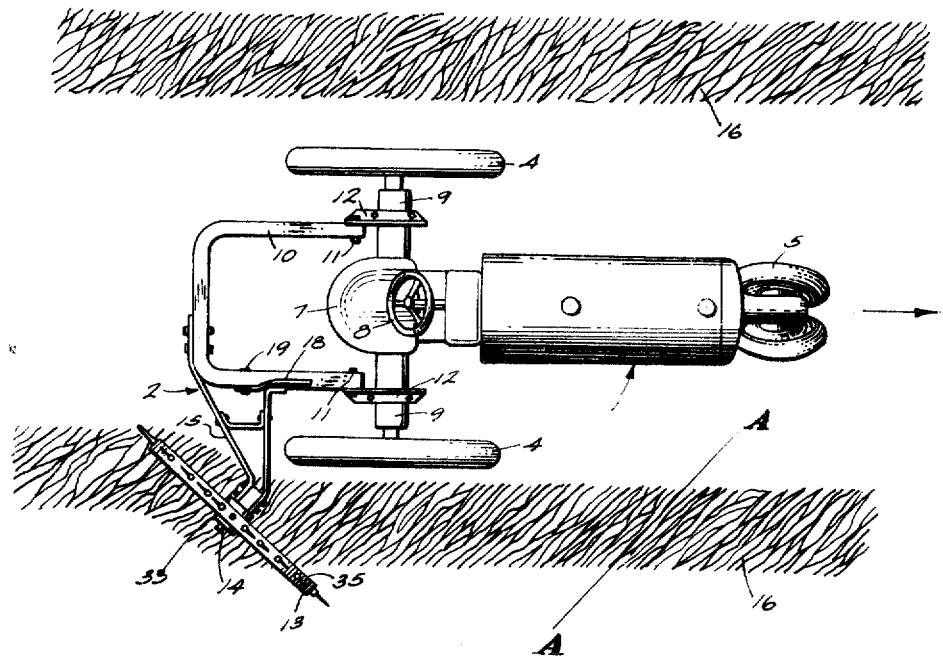
Fig. 2 is a plan view of the construction shown in Fig. 1 with the windrow turner in position for turning a right-hand windrow.
Figure 6:
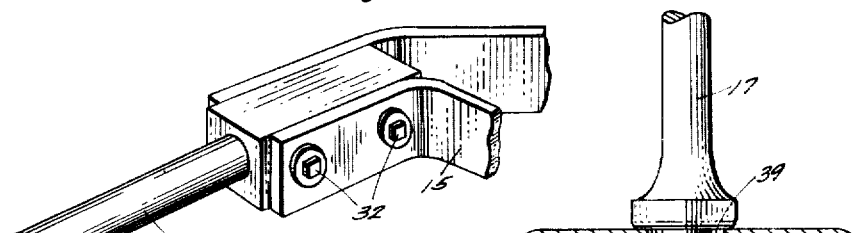
Fig. 6 is an enlarged detail perspective view showing the wheel axle mounting.

Referring to the drawings in detail, the construction shown comprises a tractor 1 and a windrow turner 2 mounted on and drawn by the tractor. The tractor may be of any usual or suitable construction comprising a chassis 3, rear wheels 4, front wheels 5, motor 6, seat 7, steering wheel 8, and axle housings 9. The windrow turner may comprise a U-shaped tubular metal frame 10 rockably mounted by means of bolts 11 on a pair of brackets 12 secured to the rear axle housings 9 and extending rearwardly from its pivotal axis, and a windrow agitating wheel 13 rotatably mounted on a stub axle 14 extending obliquely laterally and rearwardly from the end of the laterally extending bracket 15 secured to the frame 10 (Figs. 2, 3 and 6).

Figure 3:
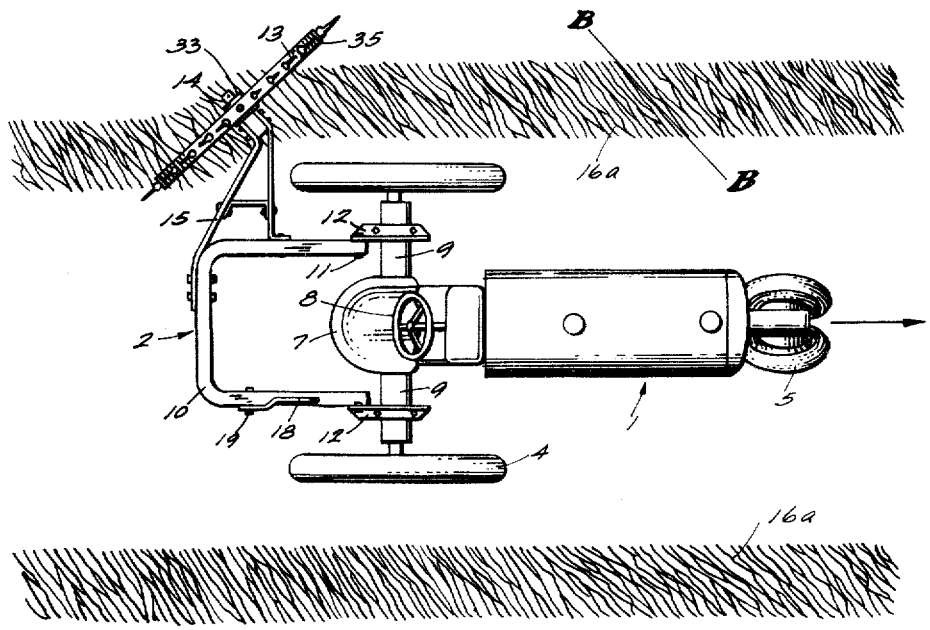
Fig. 3 is a plan view showing the turner in position for handling a left-hand windrow.

The operator, seated in the tractor seat 7, will steer the tractor so that the windrow turning wheel 13 will travel substantially centrally with respect to the windrow 16 (Fig. 2) or 16a (Fig. 3). The fingers 17 of the turning wheel will thrust themselves into the windrow, shift it laterally towards the tractor (Fig. 2) and toss and turn the cut material to expose different portions of the windrow to the drying action of the sun and wind.

Gravity acting on the wheel 13 and frame 10 urges the wheel downwardly into engagement with the windrow. In order to further urge the wheel downwardly, a spring link 18 is provided (Fig. 5), one end of which is pivotally and detachably connected by a bolt 19 to the frame 10 and the other end of which is pivotally connected at 20 to the manually operated lever 21 pivotally mounted at 22 on the angle iron 12. A suitably notched quadrant 23 is secured to the angle iron 12 for cooperation with a latch member 24 on the lever to hold the lever in any one of a number of adjusted positions. The spring link 18 comprises a metal bar 25 provided with a pair of guides 26 in which is slidably mounted a rod 27 pivotally secured at 20 to the operating lever 21. A coil compression spring 28 surrounds the rod 27 acting between a guide 26 and the collar 29 secured to the rod 27. By adjusting the upper end of the lever 21 rearwardly the spring tension acting to urge the pivoted frame 10 downwardly is increased, and vice versa. The angle iron bracket 12 is secured to the axle housings 9 by means of bolts 30 and clamps 31. The operating lever 21 is located adjacent the right-hand side of the seat 7 in convenient position for the driver.

A certain amount of contact between the turner fingers and the ground is necessary in order to cause the wheel to rotate. The degree of contact pressure may be regulated by the operator through the medium of the adjusting lever 21 and associated compression spring 28. If the windrow is light, it may be necessary to increase the pressure to compel the wheel to rotate, while if the windrow is heavy, the inertia of the windrow alone may be sufficient to turn the wheel.

In order to limit the low position of the wheel, a lock nut adjustment 31a is provided threaded on the rod 27 adjustable to limit the distance which the spring 28 can force the frame 10 and wheel 13 downwardly to prevent the weight of the wheel and frame from forcing the tined fingers 17 into the ground.

The stub axle 14 on which the turning wheel is rotatably mounted is secured to the outer ends of the bracket 15 by means of bolts 32 extending through the axle and through the legs of the bracket 15, as shown in Fig. 6.

The windrow turner attachment may be readily detached with respect to the tractor by removing the bolts 11 and 19.

Figure 7:
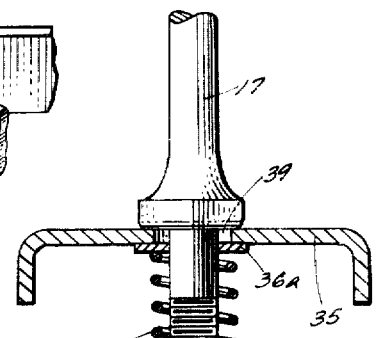
Fig. 7 is an enlarged sectional view on the line 7—7 of Fig. 8.
Figure 9:
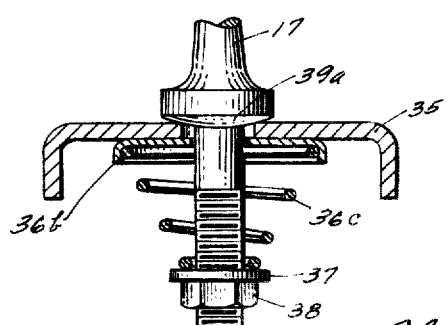
Fig. 9 is a section similar to Fig. 7 showing a modification.

The wheels 13 comprises the hub 33, the spokes 34, the rim 35, and the fingers 17 rockably mounted on the rim 35 (Fig. 7). The mounting for these fingers shown in Figs. 7 and 8 comprises a coil compression spring 36 surrounding the inner end of the finger 17 and bearing at one end against a collar or washer 36a inside the rim 35 and at the other against a washer 37 held in place on the finger 17 by means of a nut 38 threaded on the finger. The spring 36 urges the flat shoulder 39 of the finger 17 against the rim 35. In the modification shown in Fig. 9 a dished washer 36b is substituted for the washer 36a of Fig. 7. A spiro-helical spring 36c is substituted for the spring 36. The lower face 39a of the shoulder 39 is of spherical formation so that it can remain in contact with the edge of the opening in the rim 35 through which the finger 17 extends when the finger is caused to rock on the rim. The construction shown in Fig. 9 is quite similar to that shown in Fig. 7, except that the spring 36c which seats on the washer 36b is spiro-conical and the shoulder 39a which engages the rim 35 is rounded. This loose mounting of the finger facilitates the action of the wheel, particularly in case several of the fingers may be in engagement with the ground at the same time. It prevents undue strain and distortion of the fingers when the tractor is making a turn, particularly a turn to the left.

The spiro-conical shape of the spring 36c urges the finger 17 toward radial position. The compression springs 36, 36c being located on the inside of the rim are out of the way of the material being turned and are therefore not likely to be fouled up by the grain or other material.

Another advantage of this turning finger is that the wheel can slew sidewise without causing the finger points to dig in and catch in the grain.

Another advantage is that if the wheel were to encounter stones or clods of dirt while turning, the deflection enabled by the spring 36 will allow the finger to pass around the stone or clod and avoid bouncing over the obstruction, thus resulting in a smoother operation of the wheel.

An important feature of this invention is that the windrow turner wheel 13 may be selectively mounted so as to lie on either the right- or left-hand side of the medial plane of the tractor, as desired. The advantage of this selective positioning of the wheel is that it enables the machine to handle either right-hand windrows or left-hand windrows.

Fig. 2 shows the windrows 16 with the straw lying parallel to the line A—A at an angle with respect to the line of travel of the windrower. Fig. 3 shows a plan view of the windrows 16a showing the straw lying parallel to the line B—B at an angle with respect to the line of travel of the windrower. In the usual type of windrower this slanting position of the straw with respect to the line of travel is due to the action of the usual canvas or conveyor which travels laterally in rear of the sickle and carries the butts of the straw laterally so that in falling the straw will lie obliquely to the line of travel. A right-hand windrower is one in which the sickle extends to the right from the stubbleward end of the sickle, and conversely, a left-hand windrower is one in which the sickle extends to the left from the stubbleward end of the sickle. From the above it follows that the straw in the windrows laid by the right-hand windrower will be as shown in Fig. 2, and straw from the left-hand windrower will be as shown in Fig. 3.

In turning the windrow, it is desirable that the axle 14 on which the turning wheel 13 is mounted should extend in the same general direction as the straw in the windrow so that the fingers will in general lie in plane transverse to the straw as shown in Figs. 2 and 3.

For handling left-hand windrows, the rockable frame 10 is disconnected from the tractor and turned upside down and then connected to the tractor in this reverse position so that the windrow turning wheel will lie on the opposite side of the medial plane of the tractor, the position of the turning wheel being thus shifted from the position shown in Fig. 2 to the position shown in Fig. 3. It will be noted that in Fig. 3 the axis of the turning wheel extends in the same general direction as the straw lying in the windrows so that the plane of the windrow turning wheel will extend in general transversely to the straw which the wheel engages. This enables the spring fingers 17 of the windrow turning wheel to gather the material cleanly from the ground in turning the windrow.

It will be noted that the windrow turning wheel is so positioned with respect to the tractor that it moves the windrow inwardly, substantially directly behind the rear tractor wheel where it will not be run down by the tractor.

Another advantage of this arrangement is that the machine will handle windrows which lie close together, thus gaining the advantage of a large number of windrows on the field when the grain is laid.

In shifting the windrow turner from the position shown in Fig. 2 to Fig. 3, it is only necessary to remove the bolts 11, which secure the frame 10 to the brackets 12, and to remove the bolt 19 which connects the link 18 with the frame 10, turn the frame 10 upside down, and bring the frame into the position shown in Fig. 3 and then reinsert the bolts 11 and 19. Both arms of the U-shaped frame 10 are provided with openings for the insertion of the bolt 19, so that the arm 18 can be connected to the frame 10 either in the position shown in Fig. 2 or in the position shown in Fig. 3.

Another advantage of the rearward mounting of the rocking frame 10 is that when it is necessary to make a sharp turn with the tractor in order to follow a sharp turn in the windrow, the windrow wheel 13 will roll freely backwardly, as the axis of the windrow turning wheel extends close to the virtual axis of rotation of the tractor as the tractor is being turned.

Further modifications will be apparent to those skilled in the art and it is desired, therefore, that the invention be limited only by the scope of the appended claims.

In the claims where reference is made to "forwardly," it is to be understood as defining the direction of travel when the windrow turning wheel is moving in a direction to perform a useful operation on the windrow.

Having thus described my invention, what I claim and desire to secure by Letters Patent is:

1. For combination with a power vehicle having a pair of coaxial laterally spaced rear drive wheels, a windrow turner comprising a frame having hinge means for rockably mounting it on said vehicle to swing about an axis extending transversely with respect to the line of travel of the vehicle substantially parallel to the axis of said pair of wheels and fixed with respect to the axis of the coaxial wheels, and a circular windrow turning wheel rotatably mounted on said rockably mounted frame and supporting its swinging end and rotatable by peripheral engagement with the ground or an engaged windrow for turning the windrow, said rockably mounted frame lying in general in the rear of the axis of said wheels.

2. For combination with a power vehicle having a pair of coaxial laterally spaced rear drive wheels, a windrow turner comprising a frame having hinge means for rockably mounting it on said vehicle to swing about an axis extending transversely with respect to the line of travel of the vehicle substantially parallel to the axis of said pair of wheels and fixed with respect to the axis of the coaxial wheels, and a circular windrow turning wheel rotatably mounted on said rockably mounted frame and supporting its swinging end and rotatable by peripheral engagement with the ground or an engaged windrow for turning the windrow, the central point of contact of the wheel with the windrow lying outside the space between the general vertical planes of the coaxial wheels and adjacent one of said coaxial wheels, said rockably mounted frame lying in general in the rear of the axis of said wheels.

3. The combination with a power vehicle having a pair of coaxial laterally spaced rear drive wheels, of a windrow turner comprising a frame having hinge means for rockably mounting it on said vehicle to swing about an axis extending transversely with respect to the line of travel of the vehicle substantially parallel to the axis of said pair of wheels and fixed with respect to the axis of the coaxial wheels, and a circular windrow turning wheel rotatably mounted on said rockably mounted frame and supporting its swinging end and rotatable by peripheral engagement with the ground or an engaged windrow for turning the windrow, said rockably mounted frame lying in general in the rear of the axis of said wheels.

4. For combination with a power vehicle having a pair of coaxial laterally spaced rear drive wheels, a windrow turner comprising a frame having hinge means for rockably mounting it on said vehicle to swing about an axis extending transversely with respect to the line of travel of the vehicle substantially parallel to the axis of said pair of wheels and fixed with respect to the axis of the coaxial wheels, and a circular windrow turning wheel rotatably mounted on said rockably mounted frame and supporting its swinging end and rotatable by peripheral engagement with the ground or an engaged windrow for turning the windrow, the axis of said hinge means being located forwardly of the center of said windrow turning wheel, said rockably mounted frame lying in general in the rear of the axis of said wheels.

5. For combination with a power vehicle having a pair of coaxial laterally spaced rear drive wheels, a windrow turner comprising a frame having hinge means for rockably mounting it on said vehicle to swing about an axis extending transversely with respect to the line of travel of the vehicle substantially parallel to the axis of said pair of wheels and fixed with respect to the axis of the coaxial wheels, and a circular windrow turning wheel rotatably mounted on said rockably mounted frame and supporting its swinging end and rotatable by peripheral engagement with the ground or an engaged windrow for turning the windrow, the central point of contact of the wheel with the windrow lying outside the space between the general vertical planes of the coaxial wheels and adjacent one of said coaxial wheels, the axis of said hinge means being located forwardly of the center of said windrow turning wheel, said rockably mounted frame lying in general in the rear of the axis of said wheels.

6. The combination with a power vehicle having a pair of coaxial laterally spaced rear drive wheels, of a windrow turner comprising a frame having hinge means for rockably mounting it on said vehicle to swing about an axis extending transversely with respect to the line of travel of the vehicle substantially parallel to the axis of said pair of wheels and fixed with respect to the axis of the coaxial wheels, and a circular windrow turning wheel rotatably mounted on said rockably mounted frame and supporting its swinging end and rotatable by peripheral engagement with the ground or an engaged windrow for turning the windrow, the axis of said hinge means being located forwardly of the center of said windrow turning wheel, said rockably mounted frame lying in general in the rear of the axis of said wheels.

7. For combination with a power vehicle having a pair of coaxial laterally spaced rear drive wheels, a windrow turner comprising a frame having hinge means for rockably mounting it on said vehicle to swing about an axis extending transversely with respect to the line of travel of the vehicle substantially parallel to the axis of said pair of wheels and fixed with respect to the axis of the coaxial wheels, and a circular windrow turning wheel rotatably mounted on said rockably mounted frame and supporting its swinging end and rotatable by peripheral engagement with the ground or an engaged windrow for turning the windrow, the axis of said hinge means being located forwardly of the center of said windrow turning wheel and adjacent the axis of said pair of wheels, said rockably mounted frame lying in general in the rear of the axis of said wheels.

8. For combination with a power vehicle having a pair of coaxial laterally spaced rear drive wheels, a windrow turner comprising a frame having hinge means for rockably mounting it on said vehicle to swing about an axis extending transversely with respect to the line of travel of the vehicle substantially parallel to the axis of said pair of wheels and fixed with respect to the axis of the coaxial wheels, and a circular windrow turning wheel rotatably mounted on said rockably mounted frame and supporting its swinging end and rotatable by peripheral engagement with the ground or an engaged windrow for turning the windrow, the central point of contact of the wheel with the windrow lying outside the space between the general vertical planes of the coaxial wheels and adjacent one of said coaxial wheels, the axis of said hinge means being located forwardly of the center of said windrow turning wheel and adjacent the axis of said pair of wheels, said rockably mounted frame lying in general in the rear of the axis of said wheels.

9. The combination with a power vehicle having a pair of coaxial laterally spaced rear drive wheels, of a windrow turner comprising a frame having hinge means for rockably mounting it on said vehicle to swing about an axis extending transversely with respect to the line of travel of the vehicle substantially parallel to the axis of said pair of wheels and fixed with respect to the axis of the coaxial wheels, and a circular windrow turning wheel rotatably mounted on said rockably mounted frame and supporting its swinging end and rotatable by peripheral engagement with the ground or an engaged windrow for turning the windrow, the axis of said hinge means being located forwardly of the center of said windrow turning wheel and adjacent the axis of said pair of wheels, said rockably mounted frame lying in general in the rear of the axis of said wheels.

10. For combination with a power vehicle having a pair of coaxial laterally spaced rear drive wheels, a windrow turner comprising a frame having hinge means for rockably mounting it on said vehicle to swing about an axis extending transversely with respect to the line of travel of the vehicle substantially parallel to the axis of said pair of wheels and fixed with respect to the axis of the coaxial wheels, and a circular windrow turning wheel rotatably mounted on said rockably mounted frame and supporting its swinging end and rotatable by peripheral engagement with the ground or an engaged windrow for turning the windrow, the central point of contact of the wheel with the windrow lying outside the space between the general vertical planes of the coaxial wheels and adjacent one of said coaxial wheels, the axis of said hinge means being located forwardly of the center of said windrow turning wheel and adjacent the axis of said pair of wheels, the axis of said turning wheel intersecting a vertical plane through the axis of said pair of wheels at a point between the general vertical planes through said pair of wheels, respectively, said rockably mounted frame lying in general in the rear of the axis of said wheels.

11. For combination with a power vehicle having a pair of coaxial laterally spaced rear drive wheels, a windrow turner comprising a frame having hinge means for rockably mounting it on said vehicle to swing about an axis extending transversely with respect to the line of travel of the vehicle substantially parallel to the axis of said pair of wheels and fixed with respect to the axis of the coaxial wheels, and a circular windrow turning wheel rotatably mounted on said rockably mounted frame and supporting its swinging end and rotatable by peripheral engagement with the ground or an engaged windrow for turning the windrow, the central point of contact of the wheel with the windrow lying outside the space between the general vertical planes of the coaxial wheels and adjacent one of said coaxial wheels, said hinge means lying between said general vertical planes of the coaxial wheels, said rockably mounted frame lying in general in the rear of the axis of said wheels.

12. The combination with a power vehicle having a pair of coaxial laterally spaced rear drive wheels, of a windrow turner comprising a frame having hinge means for rockably mounting it on said vehicle to swing about an axis extending transversely with respect to the line of travel of the vehicle substantially parallel to the axis of said pair of wheels and fixed with respect to the axis of the coaxial wheels, and a circular windrow turning wheel rotatably mounted on said rockably mounted frame and supporting its swinging end and rotatable by peripheral engagement with the ground or an engaged windrow for turning the windrow, the distance between the axis of said hinge means and the axis of said coaxial wheels being not greater than the radius of said wheels, said rockably mounted frame lying in general in the rear of the axis of said wheels.

13. The combination with a power vehicle having a pair of coaxial laterally spaced rear drive wheels, of a windrow turner comprising a frame having hinge means for rockably mounting it on said vehicle to swing about an axis extending transversely with respect to the line of travel of the vehicle substantially parallel to the axis of said pair of wheels and fixed with respect to the axis of the coaxial wheels, and a circular windrow turning wheel rotatably mounted on said rockably mounted frame and supporting its swinging end and rotatable by peripheral engagement with the ground or an engaged windrow for turning the windrow, said rockably mounted frame lying in general in the rear of the axis of said wheels, said vehicle having a seat lying between the planes of said driving wheels and means operable by the driver in the seat for controlling the raising and lowering of the frame.

14. For combination with a power vehicle having a pair of coaxial laterally spaced rear drive wheels, a windrow turner comprising a frame having hinge means for rockably mounting it on said vehicle to swing about an axis extending transversely with respect to the line of travel of the vehicle substantially parallel to the axis of said pair of wheels and fixed with respect to the axis of the coaxial wheels, and a circular windrow turning wheel rotatably mounted on said rockably mounted frame and supporting its swinging end and rotatable by peripheral engagement with the ground or an engaged windrow for turning the windrow, said rockably mounted frame lying in general in the rear of the axis of said wheels and comprising brackets attachable to the rear of the vehicle between the drive wheels.

NORMAN R. KRAUSE.

References Cited in the file of this patent

UNITED STATES PATENTS

| Number | Name | Date |
|---|---|---|
| 468,382 | Beck | Feb. 9, 1892 |
| 2,040,689 | Durhain | May 12, 1936 |
| 2,315,522 | Hauge | Apr. 6, 1943 |
| 2,432,653 | Bloom | Dec. 16, 1947 |
| 2,447,354 | Morrill | Aug. 17, 1948 |
| 2,459,961 | Pollard | Jan. 25, 1949 |

FOREIGN PATENTS

| Number | Country | Date |
|---|---|---|
| 16,403 | Great Britain | 1911 |
| 224,009 | Great Britain | Nov. 6, 1924 |
| 617,583 | France | Nov. 22, 1926 |
| 362,929 | Great Britain | Dec. 3, 1931 |